(12) United States Patent
Kurian et al.

(10) Patent No.: US 11,122,081 B2
(45) Date of Patent: Sep. 14, 2021

(54) PREVENTING UNAUTHORIZED ACCESS TO INFORMATION RESOURCES BY DEPLOYING AND UTILIZING MULTI-PATH DATA RELAY SYSTEMS AND SECTIONAL TRANSMISSION TECHNIQUES

(71) Applicant: Bank of America Corporation, Charlotte, NC (US)

(72) Inventors: Manu Kurian, Dallas, TX (US); Jo-Ann Taylor, Godalming (GB)

(73) Assignee: Bank of America Corporation, Charlotte, NC (US)

( * ) Notice: Subject to any disclaimer, the term of this patent is extended or adjusted under 35 U.S.C. 154(b) by 336 days.

(21) Appl. No.: 16/281,252

(22) Filed: Feb. 21, 2019

(65) Prior Publication Data
US 2020/0274899 A1 Aug. 27, 2020

(51) Int. Cl.
| | |
|---|---|
| *G06F 21/00* | (2013.01) |
| *H04L 29/06* | (2006.01) |
| *G06F 21/64* | (2013.01) |
| *G06F 21/62* | (2013.01) |

(52) U.S. Cl.
CPC ............. *H04L 63/18* (2013.01); *G06F 21/64* (2013.01); *H04L 63/123* (2013.01); *G06F 21/6245* (2013.01)

(58) Field of Classification Search
CPC ..... G06F 21/64; G06F 21/6245; H04L 63/18; H04L 63/123
See application file for complete search history.

(56) References Cited

U.S. PATENT DOCUMENTS

| | | | |
|---|---|---|---|
| 7,274,711 B2 * | 9/2007 | Kajizaki | H04L 47/10 370/401 |
| 7,467,202 B2 | 12/2008 | Savchuk | |
| 9,197,628 B1 | 11/2015 | Hastings | |
| 9,225,734 B1 | 12/2015 | Hastings | |
| 9,430,646 B1 | 8/2016 | Mushtaq et al. | |
| 9,716,598 B2 | 7/2017 | Kubota et al. | |
| 9,756,017 B2 | 9/2017 | Hastings | |
| 9,779,254 B2 | 10/2017 | Galil et al. | |
| 9,934,381 B1 | 4/2018 | Kindlund et al. | |
| 2009/0225758 A1 * | 9/2009 | Morimoto | H04L 45/24 370/395.1 |

(Continued)

*Primary Examiner* — Ghazal B Shehni
(74) *Attorney, Agent, or Firm* — Banner & Witcoff, Ltd.; Michael A. Springs

(57) ABSTRACT

Aspects of the disclosure relate to preventing unauthorized access to information resources by deploying and utilizing multi-path data relay systems and sectional transmission techniques. A computing platform may receive, from one or more data storage computer systems, source data associated with a source dataset. Subsequently, the computing platform may generate at least two data blocks based on the source data received from the one or more data storage computer systems, and the at least two data blocks may include one or more overlapping portions. Thereafter, the computing platform may apply one or more tags to the at least two data blocks, thereby producing at least two tagged data blocks. Then, the computing platform may select at least two paths for transmitting the at least two tagged data blocks. Subsequently, the computing platform may send, across the at least two selected paths, the at least two tagged data blocks.

19 Claims, 11 Drawing Sheets

(56) References Cited

U.S. PATENT DOCUMENTS

| | | | |
|---|---|---|---|
| 2011/0004925 A1* | 1/2011 | Giordani | G06F 21/6245 726/4 |
| 2012/0131657 A1* | 5/2012 | Sunstein | G06F 21/32 726/6 |
| 2016/0011245 A1 | 1/2016 | Gerber et al. | |
| 2017/0142231 A1* | 5/2017 | Boucadair | H04L 65/1069 |
| 2018/0018467 A1 | 1/2018 | Tsai et al. | |
| 2018/0124014 A1 | 5/2018 | Liang | |
| 2019/0052554 A1 | 2/2019 | Mukerji | |
| 2019/0052558 A1 | 2/2019 | Mehta et al. | |
| 2019/0052576 A1 | 2/2019 | Holloway et al. | |
| 2019/0052597 A1 | 2/2019 | Raghunath et al. | |
| 2019/0052608 A1 | 2/2019 | Skuratovich et al. | |
| 2019/0052609 A1 | 2/2019 | Skuratovich et al. | |
| 2019/0052616 A1 | 2/2019 | Campbell et al. | |
| 2019/0052617 A1 | 2/2019 | Chen et al. | |
| 2019/0052621 A1 | 2/2019 | Sahraei et al. | |
| 2019/0052625 A1 | 2/2019 | Iwanski et al. | |
| 2019/0052626 A1 | 2/2019 | Iwanski et al. | |
| 2019/0052630 A1 | 2/2019 | Lapidous et al. | |
| 2019/0052637 A1 | 2/2019 | Dean et al. | |
| 2019/0052646 A1 | 2/2019 | Struik | |
| 2019/0052659 A1 | 2/2019 | Weingarten et al. | |
| 2019/0052665 A1 | 2/2019 | Mahieu et al. | |
| 2019/0052683 A1 | 2/2019 | Logue et al. | |
| 2019/0052684 A1 | 2/2019 | Azim et al. | |
| 2019/0052707 A1 | 2/2019 | Wikoff | |
| 2019/0052714 A1 | 2/2019 | Shin et al. | |
| 2019/0052733 A1 | 2/2019 | Levy et al. | |
| 2019/0052753 A1 | 2/2019 | Kim et al. | |
| 2019/0052787 A1 | 2/2019 | Oshima et al. | |
| 2019/0052923 A1 | 2/2019 | Stransky-Heilkron et al. | |
| 2019/0052935 A1 | 2/2019 | Kuper et al. | |
| 2019/0052967 A1 | 2/2019 | Kim et al. | |
| 2019/0052999 A1 | 2/2019 | Lee et al. | |
| 2019/0053013 A1 | 2/2019 | Markhovsky et al. | |
| 2019/0053015 A1 | 2/2019 | Schmidt et al. | |
| 2019/0053030 A1 | 2/2019 | Baldree | |
| 2019/0053031 A1 | 2/2019 | Narang et al. | |
| 2019/0053048 A1 | 2/2019 | Bhargava et al. | |
| 2019/0053059 A1 | 2/2019 | VanderVeen et al. | |
| 2019/0053068 A1 | 2/2019 | Rappaport | |
| 2019/0053098 A1 | 2/2019 | Jo et al. | |
| 2019/0053106 A1 | 2/2019 | Russell et al. | |
| 2019/0053118 A1 | 2/2019 | Hahn et al. | |
| 2019/0053130 A1 | 2/2019 | Guo et al. | |
| 2019/0053135 A1 | 2/2019 | Hahn et al. | |
| 2019/0053158 A1 | 2/2019 | Kumar et al. | |
| 2019/0053170 A1 | 2/2019 | Lee et al. | |
| 2019/0053189 A1 | 2/2019 | Ramamurthy | |
| 2019/0053200 A1 | 2/2019 | Nammi | |
| 2019/0053226 A1 | 2/2019 | Xiong et al. | |
| 2019/0053248 A1 | 2/2019 | Chen et al. | |
| 2019/0053251 A1 | 2/2019 | Loehr et al. | |
| 2019/0053256 A1 | 2/2019 | Takeda et al. | |
| 2019/0053294 A1 | 2/2019 | Xia et al. | |
| 2019/0053312 A1 | 2/2019 | Xia et al. | |
| 2019/0053326 A1 | 2/2019 | Lee et al. | |

* cited by examiner

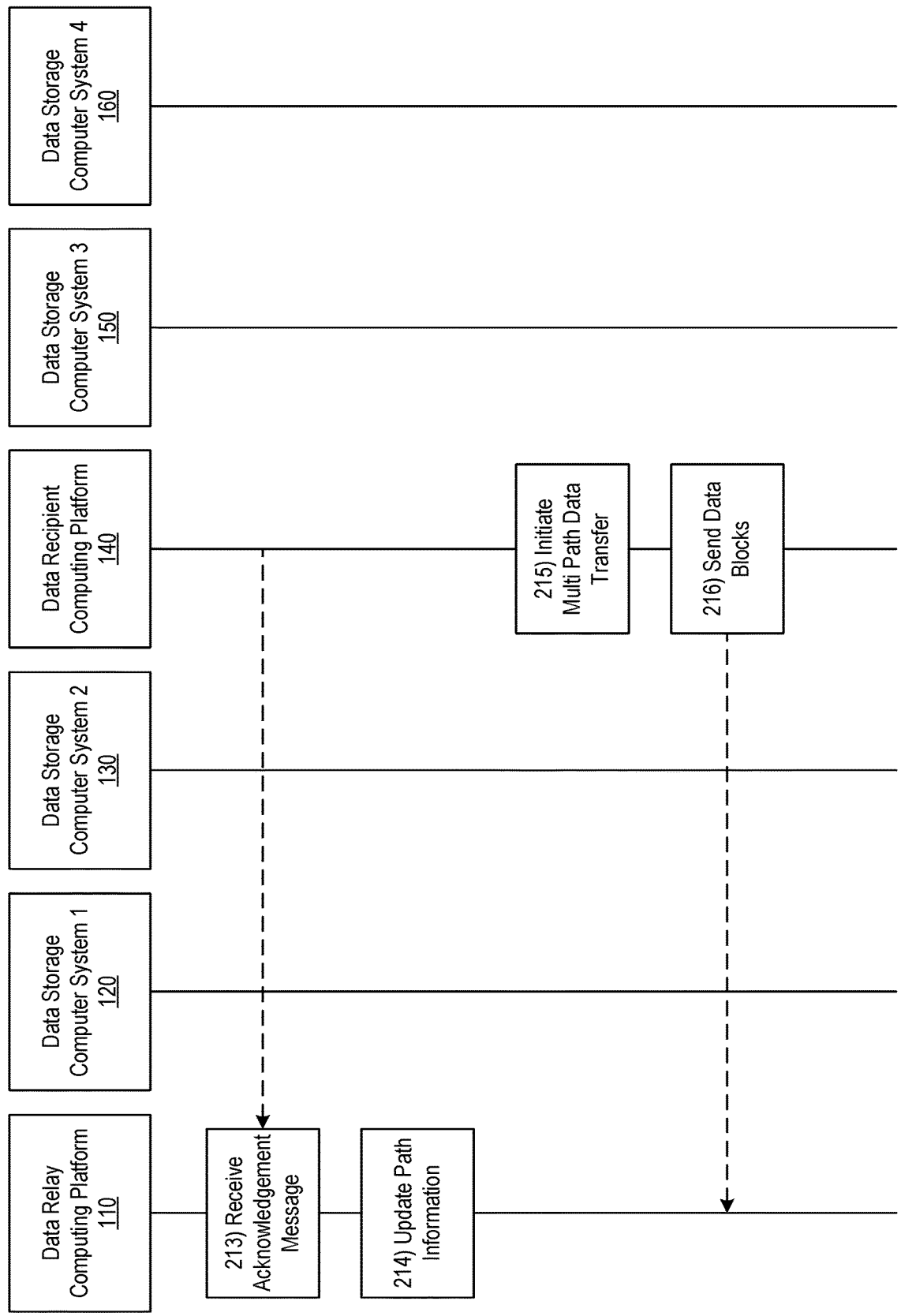

PREVENTING UNAUTHORIZED ACCESS TO INFORMATION RESOURCES BY DEPLOYING AND UTILIZING MULTI-PATH DATA RELAY SYSTEMS AND SECTIONAL TRANSMISSION TECHNIQUES

BACKGROUND

Aspects of the disclosure relate to deploying digital data processing systems, providing information security, and preventing unauthorized access to resources of an information system. In particular, one or more aspects of the disclosure relate to preventing unauthorized access to information resources by deploying and utilizing multi-path data relay systems and sectional transmission techniques.

Enterprise organizations may utilize various computing infrastructure to maintain large data sets, which may include confidential information and/or other sensitive data that is created and/or used for various purposes. In some instances, these large data sets may need to be accessed by and/or transferred across various networks and/or between various computer systems. Ensuring security when accessing and/or transferring such data may be critically important to protect the integrity and confidentiality of the underlying information. In many instances, however, it may be difficult to ensure the integrity and confidentiality of the information associated with the data sets while also attempting to optimize the resource utilization, bandwidth utilization, and efficient operations of the computing infrastructure involved in maintaining, accessing, and transferring the data.

SUMMARY

Aspects of the disclosure provide effective, efficient, scalable, and convenient technical solutions that address and overcome the technical problems associated with ensuring information security and preventing unauthorized access to resources of enterprise computer systems by deploying and utilizing multi-path data relay systems and sectional transmission techniques.

In accordance with one or more embodiments, a computing platform having at least one processor, a communication interface, and memory may receive, via the communication interface, from one or more data storage computer systems, source data associated with a source dataset. Subsequently, the computing platform may generate at least two data blocks based on the source data received from the one or more data storage computer systems, and the at least two data blocks generated based on the source data received from the one or more data storage computer systems may include one or more overlapping portions. Thereafter, the computing platform may apply one or more tags to the at least two data blocks generated based on the source data received from the one or more data storage computer systems, and applying the one or more tags to the at least two data blocks generated based on the source data received from the one or more data storage computer systems may produce at least two tagged data blocks. Then, the computing platform may select at least two paths for transmitting the at least two tagged data blocks. Subsequently, the computing platform may send, via the communication interface, and across the at least two paths selected for transmitting the at least two tagged data blocks, the at least two tagged data blocks.

In some embodiments, generating the at least two data blocks based on the source data received from the one or more data storage computer systems may include dividing the source data received from the one or more data storage computer systems into a plurality of sections, and each section of the plurality of sections may form the basis of a distinct data block of the at least two data blocks.

In some embodiments, generating the at least two data blocks based on the source data received from the one or more data storage computer systems may include: generating a first data block having a first size; and generating a second data block having a second size different from the first size.

In some embodiments, selecting the at least two paths for transmitting the at least two tagged data blocks may include: selecting a first path for transmitting the first data block based on the first size of the first data block, where the first path may have a first data transmission speed; and selecting a second path for transmitting the second data block based on the second size of the second data block, where the second path may have a second data transmission speed different from the first data transmission speed.

In some embodiments, applying the one or more tags to the at least two data blocks generated based on the source data received from the one or more data storage computer systems may include inserting one or more tags identifying a content type corresponding to the source data received from the one or more data storage computer systems.

In some embodiments, applying the one or more tags to the at least two data blocks generated based on the source data received from the one or more data storage computer systems may include inserting one or more tags identifying a security level corresponding to the source data received from the one or more data storage computer systems.

In some embodiments, selecting the at least two paths for transmitting the at least two tagged data blocks may include randomly selecting the at least two paths from a set of predefined data transmission paths.

In some embodiments, selecting the at least two paths for transmitting the at least two tagged data blocks may include: selecting a first data transmission path that includes a first sub-network and a first network node; and selecting a second data transmission path that includes a second sub-network different from the first sub-network and a second network node different from the first network node.

In some embodiments, after selecting the at least two paths for transmitting the at least two tagged data blocks, the computing platform may store path information identifying the at least two paths selected for transmitting the at least two tagged data blocks.

In some embodiments, sending the at least two tagged data blocks across the at least two paths selected for transmitting the at least two tagged data blocks may cause a recipient of the at least two tagged data blocks to validate integrity of the at least two tagged data blocks by matching the one or more overlapping portions of the at least two tagged data blocks.

In some embodiments, sending the at least two tagged data blocks across the at least two paths selected for transmitting the at least two tagged data blocks may include sending one or more data blocks of the at least two tagged data blocks across a path that includes an intermediate monitoring node configured to verify integrity of the one or more data blocks and report verification information to the computing platform.

In some embodiments, after sending the at least two tagged data blocks across the at least two paths selected for transmitting the at least two tagged data blocks, the computing platform may receive, via the communication interface, from a recipient of the at least two tagged data blocks, an acknowledgement message indicating that the at least two tagged data blocks were received and validated based on the one or more overlapping portions of the at least two tagged data blocks.

In some embodiments, after sending the at least two tagged data blocks across the at least two paths selected for transmitting the at least two tagged data blocks, the computing platform may receive, via the communication interface, from a recipient of the at least two tagged data blocks, an acknowledgement message indicating that the at least two tagged data blocks could not be validated.

In some embodiments, receiving the acknowledgement message indicating that the at least two tagged data blocks could not be validated may cause the computing platform to identify at least one path of the at least two paths selected for transmitting the at least two tagged data blocks as being faulty.

In some embodiments, the computing platform may receive, via the communication interface, from a remote computing platform, and across a plurality of different paths, a plurality of data blocks associated with a remote dataset. Subsequently, the computing platform may verify integrity of the plurality of data blocks associated with the remote dataset received from the remote computing platform across the plurality of different paths by matching at least one overlapping portion of a first data block of the plurality of data blocks associated with the remote dataset with a corresponding portion of a second data block of the plurality of data blocks associated with the remote dataset.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for preventing unauthorized access to information resources by deploying and utilizing multi-path data relay systems and sectional transmission techniques in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
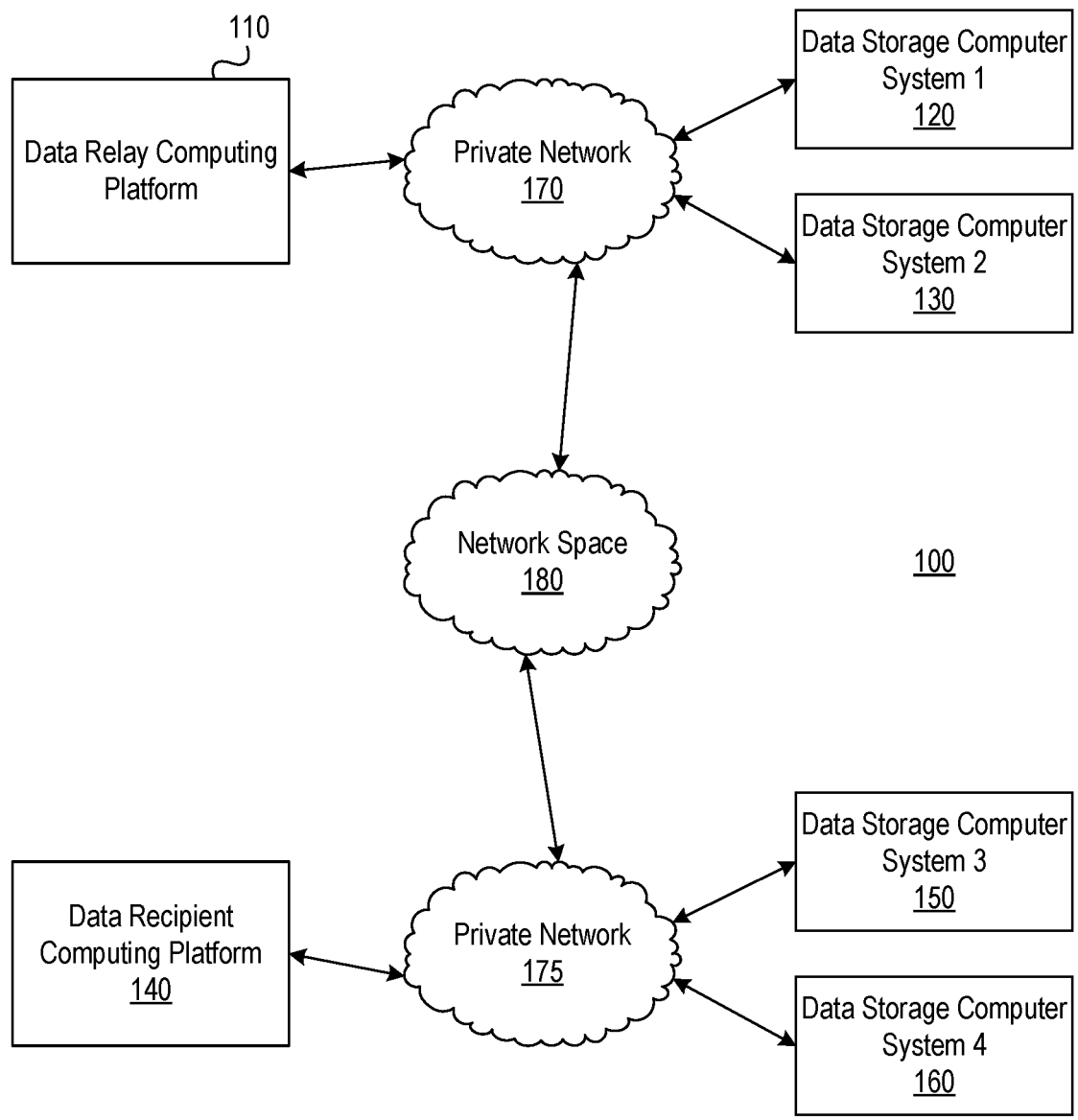
FIGS. 1A, 1B, and 1C depict an illustrative computing environment for preventing unauthorized access to information resources by deploying and utilizing multi-path data relay systems and sectional transmission techniques in accordance with one or more example embodiments.
Figure 1B:
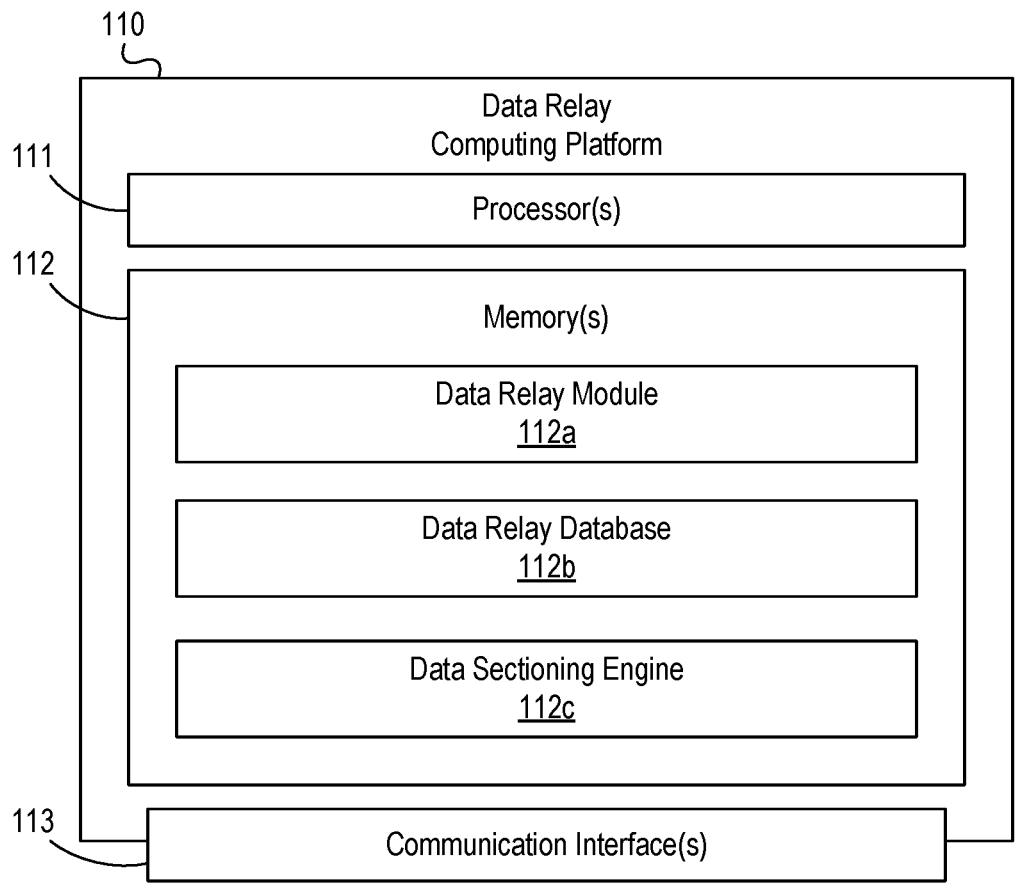
Figure 1C:
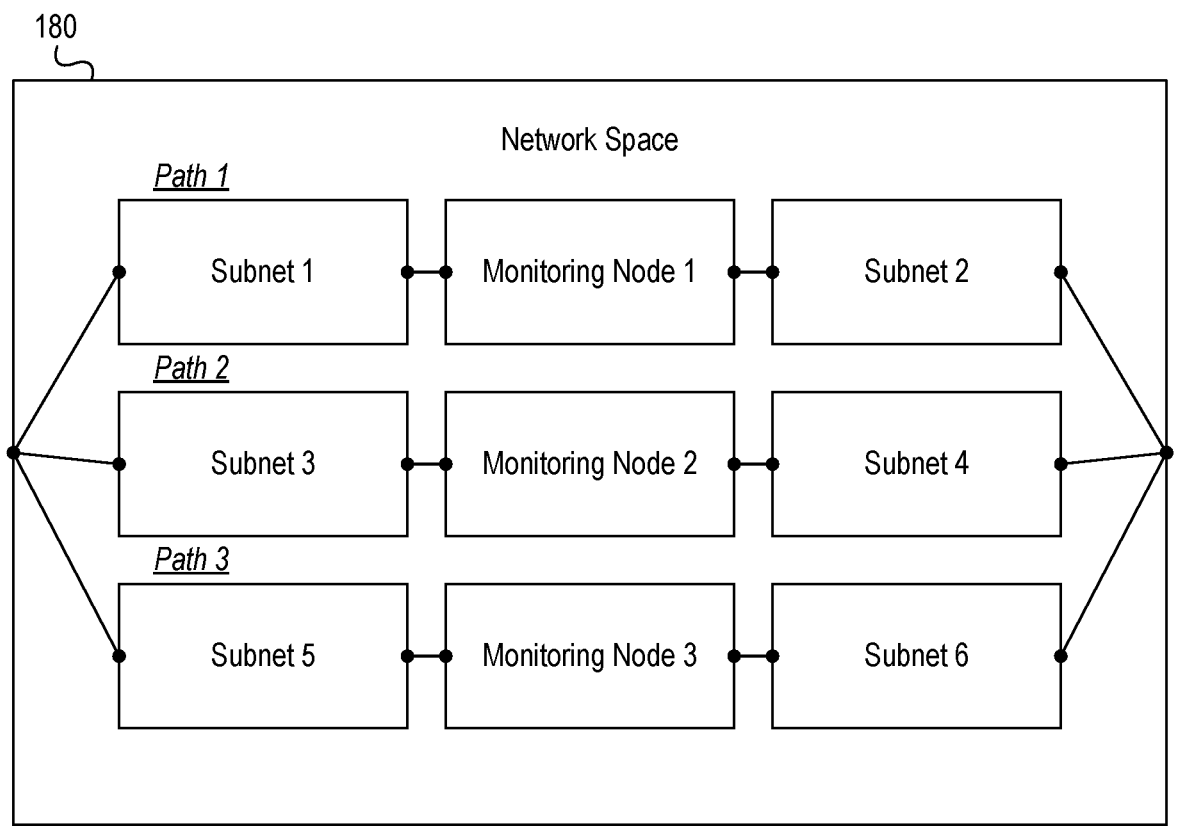

FIGS. 1A, 1B, and 1C depict an illustrative computing environment for preventing unauthorized access to information resources by deploying and utilizing multi-path data relay systems and sectional transmission techniques in accordance with one or more example embodiments. Referring to FIG. 1A, computing environment 100 may include one or more computer systems. For example, computing environment 100 may include a data relay computing platform 110, a first data storage computer system 120, a second data storage computer system 130, a data recipient computing platform 140, a third data storage computer system 150, and a fourth data storage computer system 160.

As illustrated in greater detail below, data relay computing platform 110 may include one or more computing devices configured to perform one or more of the functions described herein. For example, data relay computing platform 110 may include one or more computers (e.g., laptop computers, desktop computers, servers, server blades, or the like).

Data storage computer system 120 may include one or more computing devices and/or other computer components (e.g., processors, memories, communication interfaces). In addition, and as illustrated in greater detail below, data storage computer system 120 may be configured to store and/or otherwise maintain enterprise data and/or other data, including data that may be used by and/or support one or more transaction processing programs, loan application processing programs, and/or other programs associated with an enterprise organization, such as a financial institution. For example, data storage computer system 120 may include various servers and/or databases that store and/or otherwise maintain account information, such as financial account information including account balances, transaction history, account owner information, and/or other information. In addition, data storage computer system 120 may process and/or otherwise execute transactions on specific accounts based on commands and/or other information received from other computer systems included in computing environment 100.

Data storage computer system 130 also may include one or more computing devices and/or other computer components (e.g., processors, memories, communication interfaces). In addition, and as illustrated in greater detail below, data storage computer system 130 may be configured to store and/or otherwise maintain enterprise data and/or other data, including data that may be used by and/or support one or more transaction processing programs, loan application processing programs, and/or other programs associated with an enterprise organization, such as a financial institution. For example, data storage computer system 130 may include various servers and/or databases that store and/or otherwise maintain account information, such as financial account information including account balances, transaction history, account owner information, and/or other information. In addition, data storage computer system 130 may process and/or otherwise execute transactions on specific accounts based on commands and/or other information received from other computer systems included in computing environment 100.

Data recipient computing platform 140 may include one or more computing devices and/or other computer components (e.g., processors, memories, communication interfaces). In addition, data recipient computing platform 140 may be linked to and/or used by one or more external users (e.g., who might be associated with a different division or line of business of an enterprise organization operating data relay computing platform 110, who might not be associated with an enterprise organization operating data relay computing platform 110, and/or the like).

Data storage computer system 150 may include one or more computing devices and/or other computer components (e.g., processors, memories, communication interfaces). In addition, and as illustrated in greater detail below, data storage computer system 150 may be configured to store and/or otherwise maintain enterprise data and/or other data, including data that may be used by and/or support computing operations of data recipient computing platform 140. Data storage computer system 160 also may include one or more computing devices and/or other computer components (e.g., processors, memories, communication interfaces). In addition, and as illustrated in greater detail below, data storage computer system 160 may be configured to store and/or otherwise maintain enterprise data and/or other data, including data that may be used by and/or support computing operations of data recipient computing platform 140.

Computing environment 100 also may include one or more networks, which may interconnect one or more of data relay computing platform 110, data storage computer system 120, data storage computer system 130, data recipient computing platform 140, data storage computer system 150, and data storage computer system 160. For example, computing environment 100 may include a first private network 170 (which may, e.g., interconnect data relay computing platform 110, data storage computer system 120, data storage computer system 130, and/or one or more other systems which may be associated with a first entity, such as a first financial institution or a first group within an enterprise organization), a second private network 175 (which may, e.g., interconnect data recipient computing platform 140, data storage computer system 150, data storage computer system 160, and/or one or more other systems which may be associated with a second entity different from the first entity, such as a second financial institution or a second group within an enterprise organization), and network space 180 (which may, e.g., include one or more other systems, private networks, public networks, sub-networks, and/or the like, and which may interconnect private network 170 and private network 175).

In one or more arrangements, data storage computer system 120, data storage computer system 130, data recipient computing platform 140, data storage computer system 150, data storage computer system 160, and/or the other systems included in computing environment 100 may be any type of computing device capable of receiving a user interface, receiving input via the user interface, and communicating the received input to one or more other computing devices. For example, data storage computer system 120, data storage computer system 130, data recipient computing platform 140, data storage computer system 150, data storage computer system 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of data relay computing platform 110, data storage computer system 120, data storage computer system 130, data recipient computing platform 140, data storage computer system 150, and data storage computer system 160 may, in some instances, be special-purpose computing devices configured to perform specific functions.

Referring to FIG. 1B, data relay computing platform 110 may include one or more processors 111, memory 112, and communication interface 113. A data bus may interconnect processor 111, memory 112, and communication interface 113. Communication interface 113 may be a network interface configured to support communication between data relay computing platform 110 and one or more networks (e.g., network 170, network 175, network space 180, or the like). Memory 112 may include one or more program modules having instructions that when executed by processor 111 cause data relay computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of data relay computing platform 110 and/or by different computing devices that may form and/or otherwise make up data relay computing platform 110. For example, memory 112 may have, store, and/or include a data relay module 112a, a data relay database 112b, and a data sectioning engine 112c. Data relay module 112a may have instructions that direct and/or cause data relay computing platform 110 to prevent unauthorized access to information resources by deploying and utilizing multi-path data relay systems and sectional transmission techniques, as discussed in greater detail below. Data relay database 112b may store information used by data relay module 112a and/or data relay computing platform 110 in preventing unauthorized access to information resources by deploying and utilizing multi-path data relay systems and sectional transmission techniques. Data sectioning engine 112c may generate one or more data blocks based on source datasets to facilitate multi-path data relay and sectional transmission functions performed by data relay computing platform 110.

Referring to FIG. 1C, network space 180 may include a plurality of different data transmission paths, which may interconnect private network 170, private network 175, and/or one or more other networks and/or systems. For example, network space 180 may include a first data transmission path, a second data transmission path, and a third data transmission path. The first data transmission path may include a first subnet, a first monitoring node, and a second subnet, along which one or more data blocks may be transmitted (e.g., by data relay computing platform 110). The second data transmission path may include a third subnet, a second monitoring node, and a fourth subnet, along which one or more data blocks may be transmitted (e.g., by data relay computing platform 110). The third data transmission path may include a fifth subnet, a third monitoring node, and a sixth subnet, along which one or more data blocks may be transmitted (e.g., by data relay computing platform 110). Additionally or alternatively, network space 180 may include one or more other data transmission paths, which may include one or more other subnets, monitoring nodes, and/or other components.

Figure 2A:
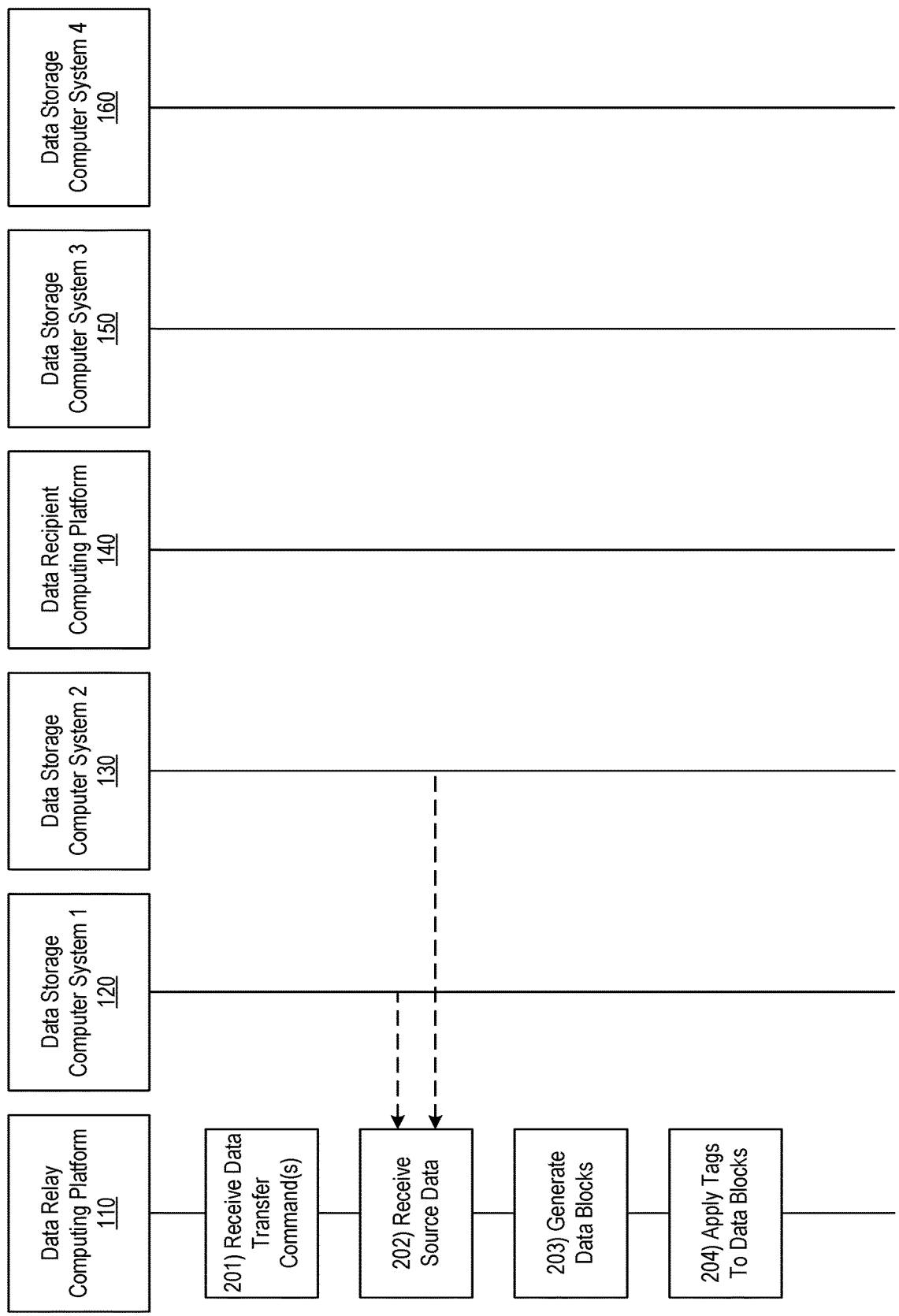

FIGS. 2A-2E depict an illustrative event sequence for preventing unauthorized access to information resources by deploying and utilizing multi-path data relay systems and sectional transmission techniques in accordance with one or more example embodiments. Referring to FIG. 2A, at step

201, data relay computing platform 110 may receive one or more data transfer commands. For example, at step 201, data relay computing platform 110 may receive one or more data transfer commands from a user of data relay computing platform 110 and/or one or more other systems requesting data relay computing platform 110 to initiate a multi-path transfer of one or more specific datasets from one or more specific source systems to one or more specific target systems.

At step 202, data relay computing platform 110 may receive source data from data storage computer system 120 and/or data storage computer system 130. For example, at step 202, data relay computing platform 110 may receive, via the communication interface (e.g., communication interface 113), from one or more data storage computer systems (e.g., data storage computer system 120, data storage computer system 130), source data associated with a source dataset. For instance, data relay computing platform 110 may receive such source data after requesting the source data set from data storage computer system 120 and/or data storage computer system 130 based on the one or more data transfer commands received by data relay computing platform 110 at step 201.

At step 203, data relay computing platform 110 may generate one or more data blocks. For example, at step 203, data relay computing platform 110 may generate at least two data blocks based on the source data received from the one or more data storage computer systems (e.g., data storage computer system 120, data storage computer system 130). In addition, the at least two data blocks generated by data relay computing platform 110 based on the source data received from the one or more data storage computer systems (e.g., data storage computer system 120, data storage computer system 130) may include one or more overlapping portions. For instance, an amount of ending data of one data block may be the same as and/or otherwise overlap with an amount of starting data of the next data block. As illustrated below, these overlapping portions in the data blocks may enable a recipient of the data blocks to verify the integrity of the data blocks after they are transmitted across one or more networks by matching data in corresponding portions of sequential data blocks. For instance, a sequence of data blocks may be created from the source data set and transmitted from a sender to a recipient, and the recipient may match the ending portion of a first data block with the starting portion of a second data block, the ending portion of the second data block with the starting portion of a third data block, and so on.

In some embodiments, generating the at least two data blocks based on the source data received from the one or more data storage computer systems may include dividing the source data received from the one or more data storage computer systems into a plurality of sections, and each section of the plurality of sections may form the basis of a distinct data block of the at least two data blocks. For example, in generating the at least two data blocks based on the source data received from the one or more data storage computer systems (e.g., data storage computer system 120, data storage computer system 130) at step 203, data relay computing platform 110 may divide the source data received from the one or more data storage computer systems (e.g., data storage computer system 120, data storage computer system 130) into a plurality of sections, and each section of the plurality of sections may form the basis of a distinct data block of the at least two data blocks. For instance, at least one end of every section may overlap with at least one end of another section (and thus, e.g., parts of the source data corresponding to the overlapping portions may appear in multiple data blocks and may be transmitted from a sender to a receiver at least twice in connection with a multi-path data transfer). In addition, each section may have a unique and/or distinct non-overlapping portion (which may, e.g., include source data that is not included in any other data block and thus might only be transmitted from a sender to a receiver once in connection with a multi-path data transfer).

In some embodiments, generating the at least two data blocks based on the source data received from the one or more data storage computer systems may include: generating a first data block having a first size; and generating a second data block having a second size different from the first size. For example, in generating the at least two data blocks based on the source data received from the one or more data storage computer systems (e.g., data storage computer system 120, data storage computer system 130) at step 203, data relay computing platform 110 may generate a first data block having a first size, and data relay computing platform 110 may generate a second data block having a second size different from the first size. For instance, data relay computing platform 110 may utilize variable data block sizes when sectioning source data in preparation of executing a multi-path data transfer.

At step 204, data relay computing platform 110 may apply one or more tags to the data blocks. For example, at step 204, data relay computing platform 110 may apply one or more tags to the at least two data blocks generated based on the source data received from the one or more data storage computer systems (e.g., data storage computer system 120, data storage computer system 130). In addition, by applying the one or more tags to the at least two data blocks generated based on the source data received from the one or more data storage computer systems (e.g., data storage computer system 120, data storage computer system 130), data relay computing platform 110 may produce at least two tagged data blocks.

In some embodiments, applying the one or more tags to the at least two data blocks generated based on the source data received from the one or more data storage computer systems may include inserting one or more tags identifying a content type corresponding to the source data received from the one or more data storage computer systems. For example, in applying the one or more tags to the at least two data blocks generated based on the source data received from the one or more data storage computer systems (e.g., data storage computer system 120, data storage computer system 130) at step 204, data relay computing platform 110 may insert, into the contents of the data blocks, one or more tags identifying a content type corresponding to the source data received from the one or more data storage computer systems (e.g., data storage computer system 120, data storage computer system 130). Such a content type may, for instance, identify the source data as being customer data, internal data, confidential data, privileged data, and/or the like.

In some embodiments, applying the one or more tags to the at least two data blocks generated based on the source data received from the one or more data storage computer systems may include inserting one or more tags identifying a security level corresponding to the source data received from the one or more data storage computer systems. For example, in applying the one or more tags to the at least two data blocks generated based on the source data received from the one or more data storage computer systems (e.g., data storage computer system 120, data storage computer system 130) at step 204, data relay computing platform 110 may insert, into the contents of the data blocks, one or more tags identifying a security level corresponding to the source data received from the one or more data storage computer systems (e.g., data storage computer system 120, data storage computer system 130). Such a security level may, for instance, identify the source data as being high security, medium security, low security, and/or the like.

Figure 2B:
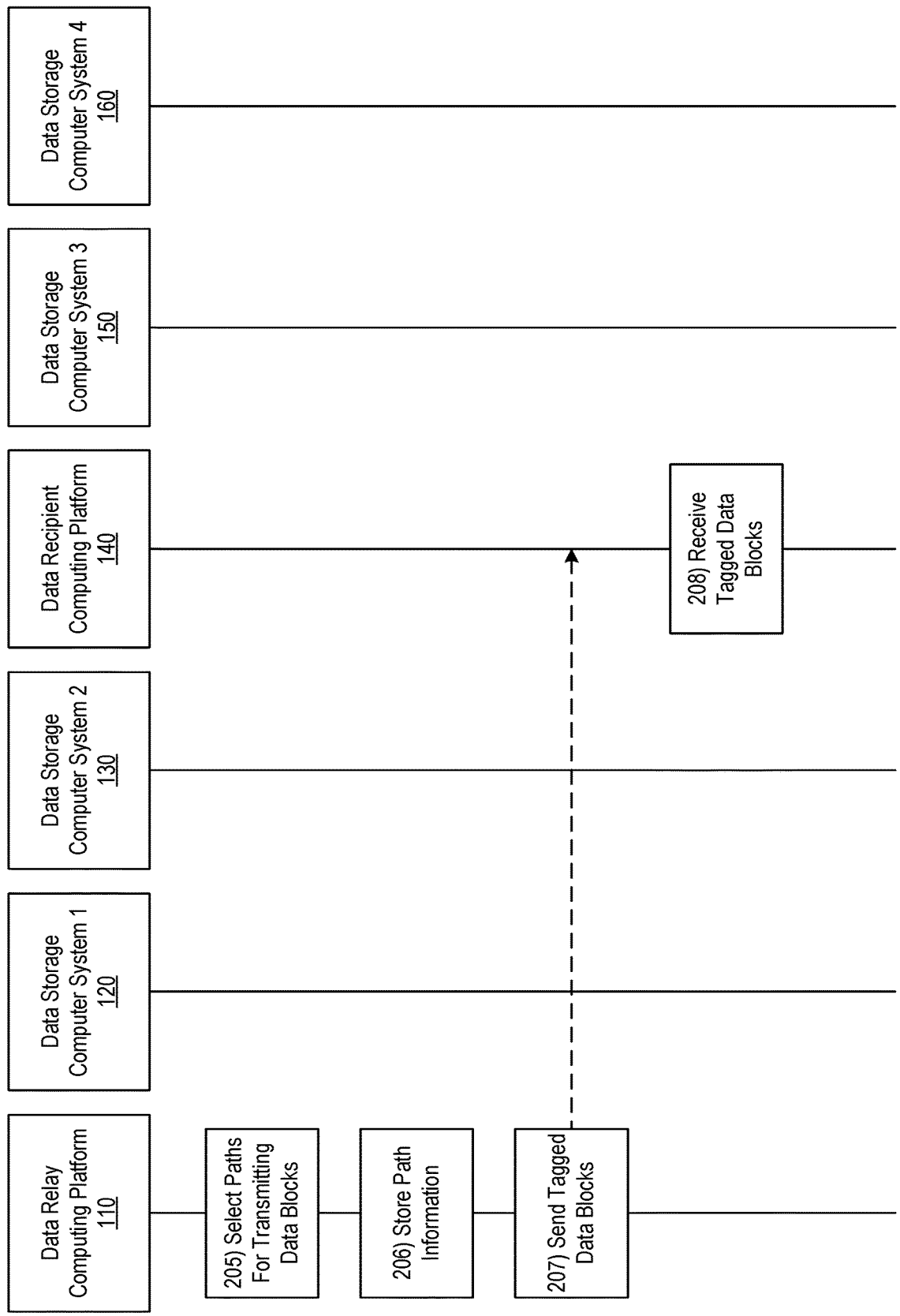

Referring to FIG. 2B, at step 205, data relay computing platform 110 may select a plurality of paths for transmitting the at least two tagged data blocks. For example, at step 205, data relay computing platform 110 may select at least two paths for transmitting the at least two tagged data blocks. For instance, data relay computing platform 110 may select multiple different data transmission paths through network space 180 (e.g., the first data transmission path, the second data transmission path, the third data transmission path, and/or the like) to use when transmitting the data blocks from data relay computing platform 110 to data recipient computing platform 140 and/or one or more other recipient systems and/or devices.

In some embodiments, selecting the at least two paths for transmitting the at least two tagged data blocks may include: selecting a first path for transmitting the first data block based on the first size of the first data block, where the first path has a first data transmission speed; and selecting a second path for transmitting the second data block based on the second size of the second data block, where the second path has a second data transmission speed different from the first data transmission speed. For example, in selecting the at least two paths for transmitting the at least two tagged data blocks at step 205, data relay computing platform 110 may select a first path (e.g., through network space 180) for transmitting the first data block based on the first size of the first data block and may select a second path (e.g., through network space 180) for transmitting the second data block based on the second size of the second data block. In addition, the first path through network space 180 may have a first data transmission speed, and the second path through network space 180 may have a second data transmission speed different from the first data transmission speed. For instance, data relay computing platform 110 may select a relatively faster data transmission path through network space 180 for relatively larger data blocks, and data relay computing platform 110 may select a relatively slower data transmission path through network space 180 for relatively smaller data blocks, so that all data blocks associated with the source dataset being transmitted arrive at the recipient system around the same time.

In some embodiments, selecting the at least two paths for transmitting the at least two tagged data blocks may include randomly selecting the at least two paths from a set of predefined data transmission paths. For example, in selecting the at least two paths for transmitting the at least two tagged data blocks at step 205, data relay computing platform 110 may randomly select the at least two paths from a set of predefined data transmission paths. For instance, data relay computing platform 110 may maintain information defining a set of predefined data transmission paths through network space 180 to one or more specific recipient systems (e.g., data recipient computing platform 140), and data relay computing platform 110 may randomly select paths from this set.

In some embodiments, selecting the at least two paths for transmitting the at least two tagged data blocks may include: selecting a first data transmission path comprising a first sub-network and a first network node; and selecting a second data transmission path comprising a second sub-network different from the first sub-network and a second network node different from the first network node. For example, in selecting the at least two paths for transmitting the at least two tagged data blocks at step 205, data relay computing platform 110 may select a first data transmission path through network space 180 that includes a first sub-network and a first network node, and data relay computing platform 110 may select a second data transmission path through network space 180 that includes a second sub-network different from the first sub-network and a second network node different from the first network node. For instance, the different paths that may be selected by data relay computing platform 110 and ultimately used by data relay computing platform 110 in transmitting the data blocks may each include different physical and logical network components, and thus may provide redundancy and enhance security in the data transmission process.

Figure 3:
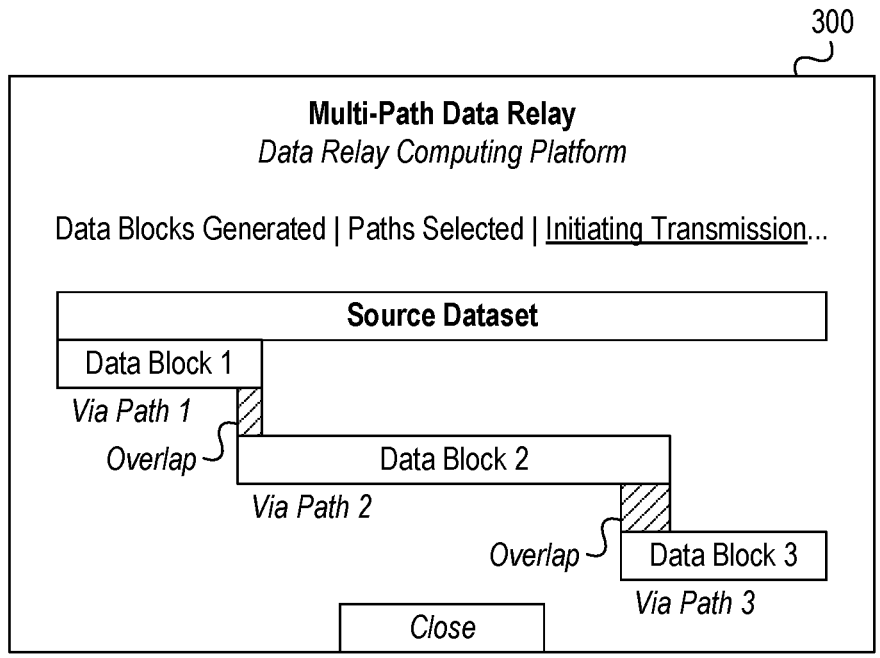
FIGS. 3-6 depict example graphical user interfaces for preventing unauthorized access to information resources by deploying and utilizing multi-path data relay systems and sectional transmission techniques in accordance with one or more example embodiments.

At step 206, data relay computing platform 110 may store path information. For example, at step 206, after selecting the at least two paths for transmitting the at least two tagged data blocks, data relay computing platform 110 may store path information identifying the at least two paths (e.g., through network space 180) selected for transmitting the at least two tagged data blocks. This path information may, for instance, allow data relay computing platform 110 to track the data transmission and identify secure and/or faulty paths after the data transmission is completed (e.g., based on receiving information from a recipient about which data blocks were received and validated and/or which data blocks were received but not validated). In some instances, in storing path information, data relay computing platform 110 may cause one or more user computing devices to display and/or present one or more graphical user interfaces similar to graphical user interface 300, which is illustrated in FIG. 3. As seen in FIG. 3, graphical user interface 300 may include text and/or other information identifying a current status of the data transmission process (e.g., "Data Blocks Generated|Paths Selected|Initiating Transmission") as well as information identifying the data blocks generated by data relay computing platform 110 from the source data set and the paths selected by data relay computing platform 110 for the multi-path data transmission.

At step 207, data relay computing platform 110 may send the tagged data blocks via the selected data transmission paths through network space 180. For example, at step 207, data relay computing platform 110 may send, via the communication interface (e.g., communication interface 113), and across the at least two paths selected for transmitting the at least two tagged data blocks (e.g., through network space 180), the at least two tagged data blocks. In some instances, data relay computing platform 110 may send multiple copies of each data block across different data transmission paths through network space 180. As illustrated below, this approach may enable a recipient (e.g., data recipient computing platform 140) to proceed with reassembling the source dataset based on a quorum of the received and validated data blocks, in instances where at least some data blocks become corrupted during the transfer.

In some embodiments, sending the at least two tagged data blocks across the at least two paths selected for transmitting the at least two tagged data blocks may cause a recipient of the at least two tagged data blocks to validate integrity of the at least two tagged data blocks by matching the one or more overlapping portions of the at least two tagged data blocks. For example, by sending the at least two tagged data blocks across the at least two paths selected for transmitting the at least two tagged data blocks (e.g., through network space 180) at step 207, data relay computing platform 110 may cause a recipient (e.g., data recipient computing platform 140) of the at least two tagged data blocks to validate integrity of the at least two tagged data blocks by matching the one or more overlapping portions of the at least two tagged data blocks. For instance, data relay computing platform 110 may cause data recipient computing platform 140 to check and/or otherwise determine whether the data blocks received by data recipient computing platform 140 are valid based on whether the overlapping portions of the data blocks still match once they are received by data recipient computing platform 140 (which may, e.g., reveal if the data blocks were transmitted through network space 180 without being intercepted, maliciously modified, and/or the like during the data transmission process).

In some embodiments, sending the at least two tagged data blocks across the at least two paths selected for transmitting the at least two tagged data blocks may include sending one or more data blocks of the at least two tagged data blocks across a path comprising an intermediate monitoring node configured to verify integrity of the one or more data blocks and report verification information to the computing platform. For example, in sending the at least two tagged data blocks across the at least two paths selected for transmitting the at least two tagged data blocks at step 207, data relay computing platform 110 may send one or more data blocks of the at least two tagged data blocks across a data transmission path in network space 180 that includes an intermediate monitoring node (e.g., the first monitoring node in network space 180, the second monitoring node in network space 180, the third monitoring node in network space 180, and/or the like), which may verify the integrity of the one or more data blocks as they pass through the monitoring node along the data transmission path and subsequently report verification information back to data relay computing platform 110 (e.g., indicating whether or not the integrity of the one or more data blocks was verified or not).

At step 208, data recipient computing platform 140 may receive the tagged data blocks. For example, at step 208, data recipient computing platform 140 may receive one or more of the tagged data blocks sent by data relay computing platform 110 across the various selected data transmission paths.

Figure 2C:
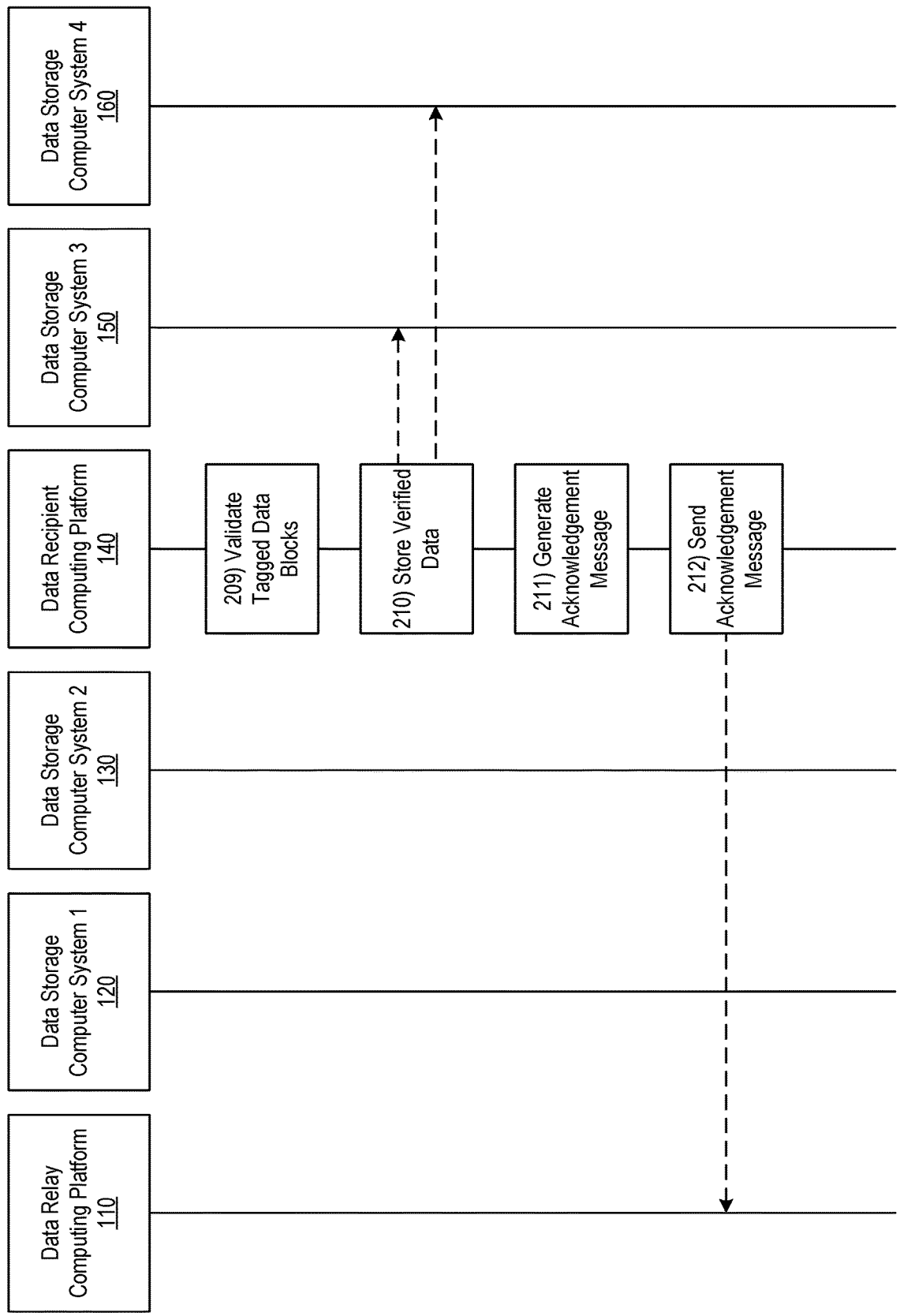

Referring to FIG. 2C, at step 209, data recipient computing platform 140 may data recipient computing platform 140 may validate the tagged data blocks. For example, at step 209, data recipient computing platform 140 may determine whether the received data blocks are valid by attempting match corresponding overlapping portions of different data blocks with each other. If the corresponding overlapping portions of different data blocks match with each other, data recipient computing platform 140 may treat such data blocks as valid (e.g., data recipient computing platform 140 may treat the integrity of such blocks as verified); if the corresponding overlapping portions of different data blocks do not match with each other, data recipient computing platform 140 may treat such data blocks as invalid (e.g., data recipient computing platform 140 may treat the integrity of such blocks as not verified). In instances where multiple copies of the same block are sent via different paths, data recipient computing platform 140 may be able to use a quorum of verified copies of the same block, even if one or more copies of the particular block cannot be verified.

At step 210, data recipient computing platform 140 may store verified data with data storage computer system 150 and/or data storage computer system 160. For instance, data recipient computing platform 140 may reassemble the source dataset from the validated and/or verified data blocks and may store the dataset with data storage computer system 150 and/or data storage computer system 160. At step 211, data recipient computing platform 140 may generate an acknowledgement message (which may, e.g., indicate that one or more of the data blocks were received, validated in full, validated based on a quorum, not validated, and/or the like, as discussed in greater detail below) based on the validation performed at step 209 and/or the storage performed at step 210. At step 212, data recipient computing platform 140 may send the acknowledgement message to data relay computing platform 110.

Referring to FIG. 2D, at step 213, data relay computing platform 110 may receive an acknowledgement message from data recipient computing platform 140. For example, at step 213, data relay computing platform 110 may receive the acknowledgement message generated by data recipient computing platform 140 indicating that one or more of the data blocks were received, validated in full, validated based on a quorum, not validated, and/or the like.

Figure 4:
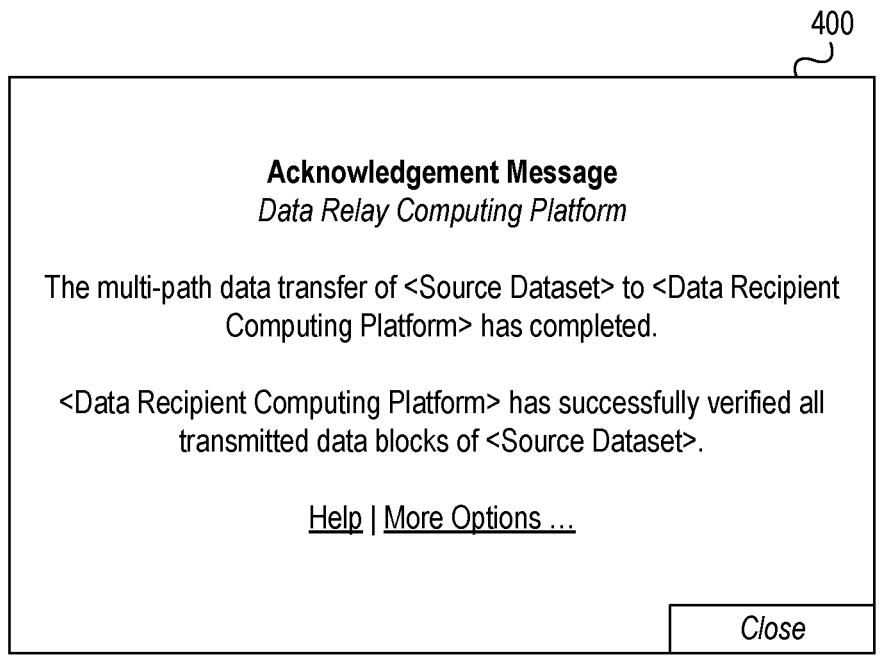

In some instances, at step 213, after sending the at least two tagged data blocks across the at least two paths selected for transmitting the at least two tagged data blocks (e.g., through network space 180), data relay computing platform 110 may receive, via the communication interface (e.g., communication interface 113), from a recipient of the at least two tagged data blocks (e.g., data recipient computing platform 140), an acknowledgement message indicating that the at least two tagged data blocks were received and validated based on the one or more overlapping portions of the at least two tagged data blocks. In some instances, in receiving such an acknowledgement message, data relay computing platform 110 may cause one or more user computing devices to display and/or present one or more graphical user interfaces similar to graphical user interface 400, which is illustrated in FIG. 4. As seen in FIG. 4, graphical user interface 400 may include text and/or other information identifying that the data transfer has been completed and that the recipient was able to verify all of the data blocks transmitted by data relay computing platform 110 (e.g., "The multi-path data transfer of <Source Dataset> to <Data Recipient Computing Platform> has completed. <Data Recipient Computing Platform> has successfully verified all transmitted data blocks of <Source Dataset>.").

In some instances, at step 213, after sending the at least two tagged data blocks across the at least two paths selected for transmitting the at least two tagged data blocks (e.g., through network space 180), data relay computing platform 110 may receive, via the communication interface (e.g., communication interface 113), from a recipient of the at least two tagged data blocks (e.g., data recipient computing platform 140), an acknowledgement message indicating that the at least two tagged data blocks could not be validated.

Figure 5:
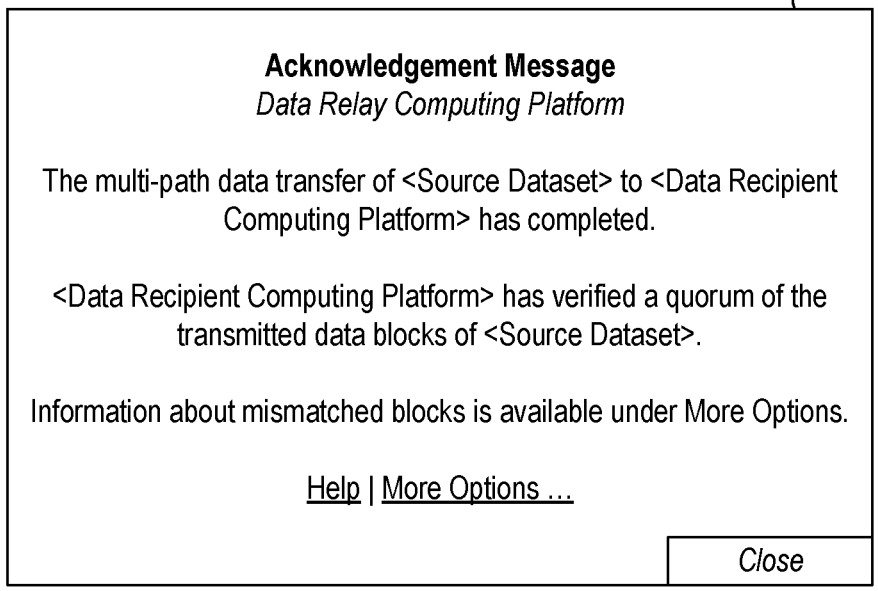

In some instances, in receiving such an acknowledgement message, data relay computing platform 110 may cause one or more user computing devices to display and/or present one or more graphical user interfaces similar to graphical user interface 500, which is illustrated in FIG. 5. As seen in FIG. 5, graphical user interface 500 may include text and/or other information identifying that the data transfer has been completed and that the recipient was able to verify some of the data blocks transmitted by data relay computing platform 110 but not others (e.g., "The multi-path data transfer of <Source Dataset> to <Data Recipient Computing Platform> has completed. <Data Recipient Computing Platform> has verified a quorum of the transmitted data blocks of <Source Dataset>. Information about mismatched blocks is available under More Options."). In this example, the recipient of the data blocks transmitted by data relay computing platform 110 may have received multiple copies of all of the data blocks from data relay computing platform 110, and while some copies of some data blocks could not be verified, enough copies of all data blocks were received and verified that the recipient of the data blocks transmitted by data relay computing platform 110 could reassemble the source dataset using a quorum of the received and verified data blocks. In some instances, the amount of quorum required (or even whether a quorum-based approach is allowable, e.g., based on the security level of the data itself) may be defined by data relay computing platform 110 and encoded in the tags applied to the data blocks by data relay computing platform 110 prior to sending them to the recipient(s).

Figure 6:
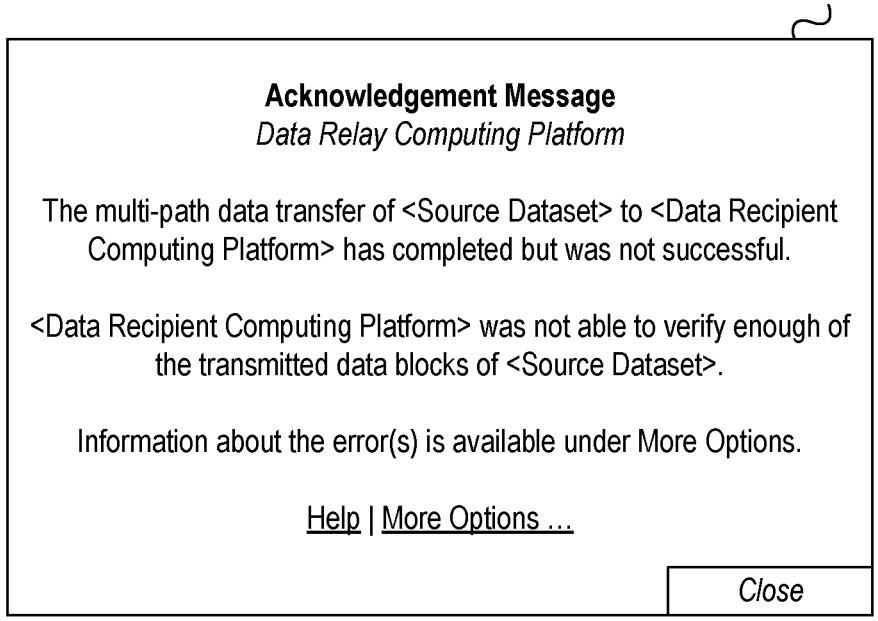

In some instances, in receiving an acknowledgement message indicating that the at least two tagged data blocks could not be validated, data relay computing platform 110 may cause one or more user computing devices to display and/or present one or more graphical user interfaces similar to graphical user interface 600, which is illustrated in FIG. 6. As seen in FIG. 6, graphical user interface 600 may include text and/or other information identifying that the data transfer has been completed and but that the recipient was not able to verify a sufficient number of data blocks to reassemble the source data set (e.g., "The multi-path data transfer of <Source Dataset> to <Data Recipient Computing Platform> has completed but was not successful. <Data Recipient Computing Platform> was not able to verify enough of the transmitted data blocks of <Source Dataset>. Information about the error(s) is available under More Options."). In this example, data relay computing platform 110 might need to re-send one or more data blocks to the recipient, via different data transmission paths than previously used, in order to complete the transfer.

In some embodiments, receiving the acknowledgement message indicating that the at least two tagged data blocks could not be validated may cause the computing platform to identify at least one path of the at least two paths selected for transmitting the at least two tagged data blocks as being faulty. For example, as a result of receiving the acknowledgement message indicating that the at least two tagged data blocks could not be validated, data relay computing platform 110 may identify at least one path of the at least two paths selected for transmitting the at least two tagged data blocks as being faulty. For instance, data relay computing platform 110 may determine that a specific path is faulty based on the acknowledgement message identifying which block(s) could not be validated and based on the path information specifying which blocks were transmitted via which paths.

At step 214, data relay computing platform 110 may update the path information. For instance, at step 214, data relay computing platform 110 may update the path information to identify that specific paths are valid or faulty, that specific paths are fast or slow, and/or the like, based on the completed data transmission process and/or one or more acknowledgement messages received from the recipient (e.g., data recipient computing platform 140).

Subsequently, data relay computing platform 110 may receive a multi-path data transfer from another system, such as data recipient computing platform 140, and validate one or more received data blocks by matching corresponding overlapping portions of such blocks, so as to reassemble a dataset being transmitted. For example, at step 214, data recipient computing platform 140 may initiate a multi-path data transfer (which may, e.g., involve data recipient computing platform 140 performing one or more steps described above in connection with the multi-path data transfer performed by data relay computing platform 110). At step 216, data recipient computing platform 140 may send a plurality of data blocks to data relay computing platform 110 to facilitate the multi-path data transfer.

Figure 2E:
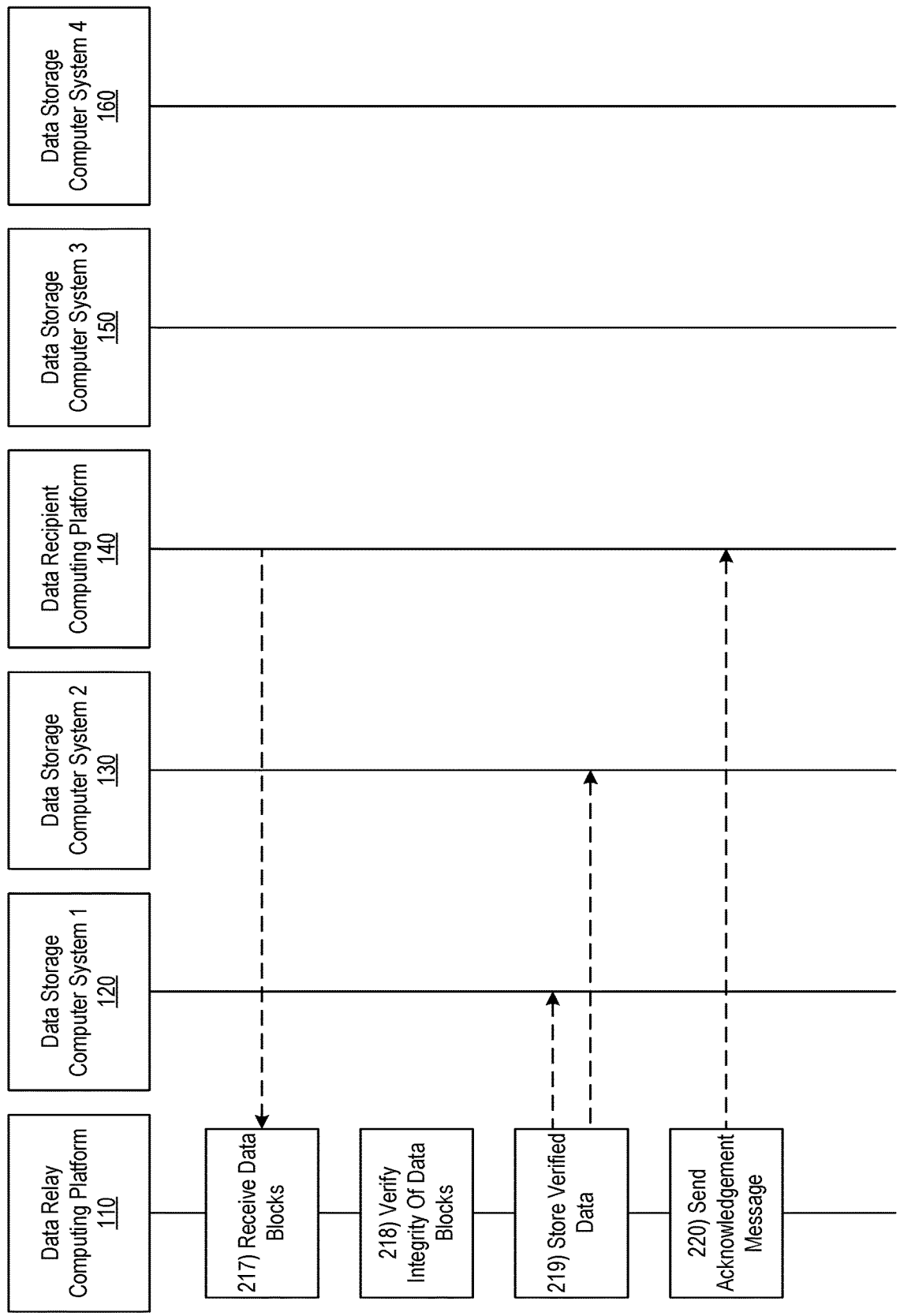

Referring to FIG. 2E, at step 217, data relay computing platform 110 may receive the plurality of data blocks from data recipient computing platform 140 across various different data transmission paths. For example, at step 217, data relay computing platform 110 may receive, via the communication interface (e.g., communication interface 113), from a remote computing platform (e.g., data recipient computing platform 140), and across a plurality of different paths, a plurality of data blocks associated with a remote dataset.

At step 218, data relay computing platform 110 may verify the integrity of the received data blocks. For example, at step 218, data relay computing platform 110 may verify integrity of the plurality of data blocks associated with the remote dataset received from the remote computing platform (e.g., data recipient computing platform 140) across the plurality of different paths by matching at least one overlapping portion of a first data block of the plurality of data blocks associated with the remote dataset with a corresponding portion of a second data block of the plurality of data blocks associated with the remote dataset. In some instances, data relay computing platform 110 may receive multiple copies of each data block and if one or more copies of a particular data block are corrupted, data relay computing platform 110 might still be able to verify the data block if a quorum of copies of that data block are verifiable.

At step 219, data relay computing platform 110 may store the verified data associated with the remote dataset with data storage computer system 120 and/or data storage computer system 130. At step 220, data relay computing platform 110 may send an acknowledgement message to data recipient computing platform 140. For instance, data relay computing platform 110 may send an acknowledgement message like the example acknowledgement messages described above (e.g., indicating that one or more of the data blocks were received, validated in full, validated based on a quorum, not validated, and/or the like).

Figure 7:
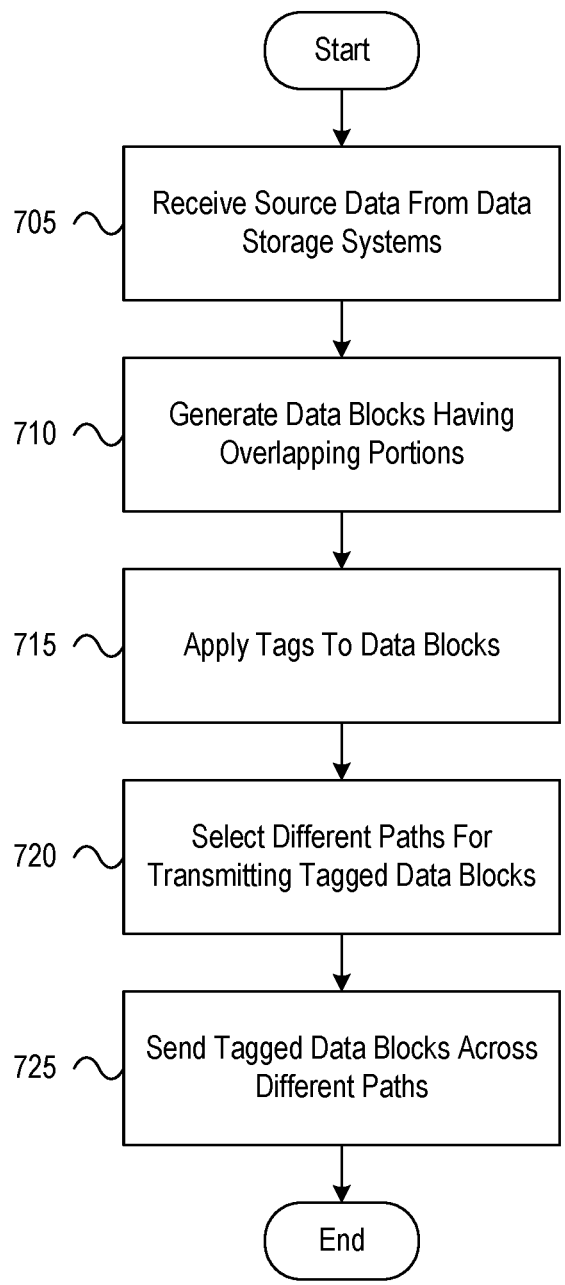
FIG. 7 depicts an illustrative method for preventing unauthorized access to information resources by deploying and utilizing multi-path data relay systems and sectional transmission techniques in accordance with one or more example embodiments.

FIG. 7 depicts an illustrative method for preventing unauthorized access to information resources by deploying and utilizing multi-path data relay systems and sectional transmission techniques in accordance with one or more example embodiments. Referring to FIG. 7, at step 705, a computing platform having at least one processor, a communication interface, and memory may receive, via the communication interface, from one or more data storage computer systems, source data associated with a source dataset. At step 710, the computing platform may generate at least two data blocks based on the source data received from the one or more data storage computer systems, and the at least two data blocks generated based on the source data received from the one or more data storage computer systems may include one or more overlapping portions. At step 715, the computing platform may apply one or more tags to the at least two data blocks generated based on the source data received from the one or more data storage computer systems, and applying the one or more tags to the at least two data blocks generated based on the source data received from the one or more data storage computer systems may produce at least two tagged data blocks. At step 720, the computing platform may select at least two paths for transmitting the at least two tagged data blocks. At step 725, the computing platform may send, via the communication interface, and across the at least two paths selected for transmitting the at least two tagged data blocks, the at least two tagged data blocks.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      receive, via the communication interface, from one or more data storage computer systems, source data associated with a source dataset;
      generate at least two data blocks based on the source data received from the one or more data storage computer systems, wherein the at least two data blocks generated based on the source data received from the one or more data storage computer systems comprise one or more overlapping portions;
      apply one or more tags to the at least two data blocks generated based on the source data received from the one or more data storage computer systems, wherein applying the one or more tags to the at least two data blocks generated based on the source data received from the one or more data storage computer systems produces at least two tagged data blocks;
      select at least two paths for transmitting the at least two tagged data blocks;
      send, via the communication interface, and across the at least two paths selected for transmitting the at least two tagged data blocks, the at least two tagged data blocks:
      receive, via the communication interface, from a remote computing platform, and across a plurality of different paths, a plurality of data blocks associated with a remote dataset; and
      verify integrity of the plurality of data blocks associated with the remote dataset received from the remote computing platform across the plurality of different paths by matching at least one overlapping portion of a first data block of the plurality of data blocks associated with the remote dataset with a corresponding portion of a second data block of the plurality of data blocks associated with the remote dataset.

2. The computing platform of claim 1, wherein generating the at least two data blocks based on the source data received from the one or more data storage computer systems comprises dividing the source data received from the one or more data storage computer systems into a plurality of sections, and wherein each section of the plurality of sections forms the basis of a distinct data block of the at least two data blocks.

3. The computing platform of claim 1, wherein generating the at least two data blocks based on the source data received from the one or more data storage computer systems comprises:
   generating a first data block having a first size; and
   generating a second data block having a second size different from the first size.

4. The computing platform of claim 3, wherein selecting the at least two paths for transmitting the at least two tagged data blocks comprises:
  selecting a first path for transmitting the first data block based on the first size of the first data block, wherein the first path has a first data transmission speed; and
  selecting a second path for transmitting the second data block based on the second size of the second data block, wherein the second path has a second data transmission speed different from the first data transmission speed.

5. The computing platform of claim 1, wherein applying the one or more tags to the at least two data blocks generated based on the source data received from the one or more data storage computer systems comprises inserting one or more tags identifying a content type corresponding to the source data received from the one or more data storage computer systems.

6. The computing platform of claim 1, wherein applying the one or more tags to the at least two data blocks generated based on the source data received from the one or more data storage computer systems comprises inserting one or more tags identifying a security level corresponding to the source data received from the one or more data storage computer systems.

7. The computing platform of claim 1, wherein selecting the at least two paths for transmitting the at least two tagged data blocks comprises randomly selecting the at least two paths from a set of predefined data transmission paths.

8. The computing platform of claim 1, wherein selecting the at least two paths for transmitting the at least two tagged data blocks comprises:
  selecting a first data transmission path comprising a first sub-network and a first network node; and
  selecting a second data transmission path comprising a second sub-network different from the first sub-network and a second network node different from the first network node.

9. The computing platform of claim 1, wherein the memory stores additional computer-readable instructions that, when executed by the at least one processor, cause the computing platform to:
  after selecting the at least two paths for transmitting the at least two tagged data blocks, store path information identifying the at least two paths selected for transmitting the at least two tagged data blocks.

10. The computing platform of claim 1, wherein sending the at least two tagged data blocks across the at least two paths selected for transmitting the at least two tagged data blocks causes a recipient of the at least two tagged data blocks to validate integrity of the at least two tagged data blocks by matching the one or more overlapping portions of the at least two tagged data blocks.

11. The computing platform of claim 1, wherein sending the at least two tagged data blocks across the at least two paths selected for transmitting the at least two tagged data blocks comprises sending one or more data blocks of the at least two tagged data blocks across a path comprising an intermediate monitoring node configured to verify integrity of the one or more data blocks and report verification information to the computing platform.

12. The computing platform of claim 1, wherein the memory stores additional computer-readable instructions that, when executed by the at least one processor, cause the computing platform to:
  after sending the at least two tagged data blocks across the at least two paths selected for transmitting the at least two tagged data blocks, receive, via the communication interface, from a recipient of the at least two tagged data blocks, an acknowledgement message indicating that the at least two tagged data blocks were received and validated based on the one or more overlapping portions of the at least two tagged data blocks.

13. The computing platform of claim 1, wherein the memory stores additional computer-readable instructions that, when executed by the at least one processor, cause the computing platform to:
  after sending the at least two tagged data blocks across the at least two paths selected for transmitting the at least two tagged data blocks, receive, via the communication interface, from a recipient of the at least two tagged data blocks, an acknowledgement message indicating that the at least two tagged data blocks could not be validated.

14. The computing platform of claim 13, wherein receiving the acknowledgement message indicating that the at least two tagged data blocks could not be validated causes the computing platform to identify at least one path of the at least two paths selected for transmitting the at least two tagged data blocks as being faulty.

15. A method, comprising:
  at a computing platform comprising at least one processor, a communication interface, and memory:
    receiving, by the at least one processor, via the communication interface, from one or more data storage computer systems, source data associated with a source dataset;
    generating, by the at least one processor, at least two data blocks based on the source data received from the one or more data storage computer systems, wherein the at least two data blocks generated based on the source data received from the one or more data storage computer systems comprise one or more overlapping portions;
    applying, by the at least one processor, one or more tags to the at least two data blocks generated based on the source data received from the one or more data storage computer systems, wherein applying the one or more tags to the at least two data blocks generated based on the source data received from the one or more data storage computer systems produces at least two tagged data blocks;
    selecting, by the at least one processor, at least two paths for transmitting the at least two tagged data blocks;
    sending, by the at least one processor, via the communication interface, and across the at least two paths selected for transmitting the at least two tagged data blocks, the at least two tagged data blocks:
    receiving, via the communication interface, from a remote computing platform, and across a plurality of different paths, a plurality of data blocks associated with a remote dataset; and
    verifying, by the at least one processor, integrity of the plurality of data blocks associated with the remote dataset received from the remote computing platform across the plurality of different paths by matching at least one overlapping portion of a first data block of the plurality of data blocks associated with the remote dataset with a corresponding portion of a second data block of the plurality of data blocks associated with the remote dataset.

16. The method of claim 15, wherein generating the at least two data blocks based on the source data received from the one or more data storage computer systems comprises dividing the source data received from the one or more data storage computer systems into a plurality of sections, and wherein each section of the plurality of sections forms the basis of a distinct data block of the at least two data blocks.

17. The method of claim 15, wherein generating the at least two data blocks based on the source data received from the one or more data storage computer systems comprises:
generating a first data block having a first size; and
generating a second data block having a second size different from the first size.

18. The method of claim 17, wherein selecting the at least two paths for transmitting the at least two tagged data blocks comprises:
selecting a first path for transmitting the first data block based on the first size of the first data block, wherein the first path has a first data transmission speed; and
selecting a second path for transmitting the second data block based on the second size of the second data block, wherein the second path has a second data transmission speed different from the first data transmission speed.

19. One or more non-transitory computer-readable media storing instructions that, when executed by a computing platform comprising at least one processor, a communication interface, and memory, cause the computing platform to:
receive, via the communication interface, from one or more data storage computer systems, source data associated with a source dataset;
generate at least two data blocks based on the source data received from the one or more data storage computer systems, wherein the at least two data blocks generated based on the source data received from the one or more data storage computer systems comprise one or more overlapping portions;
apply one or more tags to the at least two data blocks generated based on the source data received from the one or more data storage computer systems, wherein applying the one or more tags to the at least two data blocks generated based on the source data received from the one or more data storage computer systems produces at least two tagged data blocks;
select at least two paths for transmitting the at least two tagged data blocks;
send, via the communication interface, and across the at least two paths selected for transmitting the at least two tagged data blocks, the at least two tagged data blocks;
receive, via the communication interface, from a remote computing platform, and across a plurality of different paths, a plurality of data blocks associated with a remote dataset; and
verify integrity of the plurality of data blocks associated with the remote dataset received from the remote computing platform across the plurality of different paths by matching at least one overlapping portion of a first data block of the plurality of data blocks associated with the remote dataset with a corresponding portion of a second data block of the plurality of data blocks associated with the remote dataset.

* * * * *

UNITED STATES PATENT AND TRADEMARK OFFICE
CERTIFICATE OF CORRECTION

PATENT NO. : 11,122,081 B2  
APPLICATION NO. : 16/281252  
DATED : September 14, 2021  
INVENTOR(S) : Kurian et al.

It is certified that error appears in the above-identified patent and that said Letters Patent is hereby corrected as shown below:

In the Claims

Column 16, Line 39:
In Claim 1, delete "blocks:" and insert --blocks;--

Column 18, Line 52:
In Claim 15, delete "blocks:" and insert --blocks;--

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*